United States Patent
Hwang et al.

(10) Patent No.: US 6,470,113 B1
(45) Date of Patent: Oct. 22, 2002

(54) BROADBAND LIGHT SOURCE USING SEED-BEAM

(75) Inventors: Seong-Teak Hwang, Kyonggi-do (KR);
Soo-Young Yoon, Kyonggi-do (KR);
Rae-Sung Jung, Kyhonggi-do (KR);
Jeong-Mee Kim, Kyonggi-do (KR);
Sung-Jun Kim, Pyongtaek (JP)

(73) Assignee: Samsung Electronics Co., Ltd., Suwon (KR)

( * ) Notice: Subject to any disclaimer, the term of this patent is extended or adjusted under 35 U.S.C. 154(b) by 227 days.

(21) Appl. No.: 09/612,437

(22) Filed: Jul. 7, 2000

(30) Foreign Application Priority Data

Jul. 21, 1999 (KR) .............................. 99-29516

(51) Int. Cl.[7] .................................................. G02B 6/66
(52) U.S. Cl. ................................ 385/27; 385/39; 372/6; 357/341.1
(58) Field of Search ............................ 385/27, 39, 123; 372/6; 359/341.1

(56) References Cited

U.S. PATENT DOCUMENTS

| | | | |
|---|---|---|---|
| 5,015,054 A | * | 5/1991 | Chaffee ........................ 359/240 |
| 5,136,420 A | | 8/1992 | Inagaki et al. |
| 5,530,582 A | | 6/1996 | Clark |
| 5,568,309 A | | 10/1996 | Rockwell |
| 5,633,964 A | * | 5/1997 | DiGiovanni et al. ............ 372/6 |
| 5,652,763 A | | 7/1997 | Delfyett, Jr. |
| 5,689,595 A | | 11/1997 | Pan |
| 5,790,303 A | | 8/1998 | Weston et al. |
| 5,815,309 A | | 9/1998 | Lawrence et al. |
| 5,861,973 A | | 1/1999 | Inagaki et al. |
| 5,963,363 A | | 10/1999 | Weston et al. |
| 6,151,338 A | * | 11/2000 | Grubb et al. .................... 372/6 |
| 6,330,384 B1 | * | 12/2001 | Ryu et al. ...................... 357/177 |

\* cited by examiner

Primary Examiner—Hemang Sanghavi
Assistant Examiner—Sung Pak
(74) Attorney, Agent, or Firm—Robert E. Bushnell, Esq.

(57) ABSTRACT

Disclosed is a broadband light source for measurement using a seed-beam which can reduce the strength difference between the output lights per wavelength by heightening the strength of the output light corresponding to the L-band of the light source, and thus reduce the measurement error per wavelength. The broadband light source includes a seed-beam light source for outputting a seed-beam of a predetermined band of wavelength, a first optical coupler for combining the seed-beam and a pumping light and making a combined light incident to a front of a rare earth ion-doped optical fiber, a first pumping light source for providing the pumping light to the first optical coupler, a second optical coupler for making the input pumping light incident to a rear of the rare earth ion-doped optical fiber, a second pumping light source for providing the pumping light to the second optical coupler, and an output terminal for radiating the light outputted through the rear of the rare earth ion-doped optical fiber.

29 Claims, 3 Drawing Sheets

BROADBAND LIGHT SOURCE USING SEED-BEAM

CLAIM OF PRIORITY

This application makes reference to, incorporates the same herein, and claims all benefits accruing under 35 U.S.C. §119 from an application entitled BROADBAND LIGHT SOURCE USING SEED-BEAM earlier filed in the Korean Industrial Property Office on the Jul. 21, 1999, and there duly assigned Serial No. 29516/1999, a copy of which is annexed hereto.

BACKGROUND OF THE INVENTION

1. Technical Field

The present invention relates to a light source for measurement of the characteristics of an optical device, and more particularly to a broadband light source using a rare earth ion-doped optical fiber.

2. Related Art

Wavelength division multiplex (WDM) transmission is an information transmission scheme using optical fibers in which the wavelength area of an optical fiber is separated into a plurality of channels, the channels are multiplexed, and thus signals at different wavelengths are transmitted through the optical fiber at the same time, to thereby increase information transmission capacity.

A plurality of optical amplifiers are used between a transmitter and a receiver in a wavelength division multiplex transmission system to compensate for signal attenuation resulting from long distance transmission.

I have found that it would be desirable to improve a light source for measurement of the characteristics of an optical device. Efforts have been made to improve optics-related devices.

Exemplars of recent efforts in the art include U.S. Pat. No. 5,815,309 for An Optical and Process for Amplifying an Optical Signal Propagating in a Fiber Optic issued to Lawrence et al., U.S. Pat. No. 5,652,763 for A Mode Locked Laser Diode in a High Power Solid State Regenerative Amplifier and Mount Mechanism issued to Delfyett, Jr., U.S. Pat. No. 5,790,303 for A System for Amplifying an Optical Pulse Using a Diode-Pumped, Q-Switched, Intracavity-Doubled Laser to Pump an Optical Amplifier issued Weston et al., U.S. Pat. No. 5,530,582 for A Fiber Source for Seeding an Ultrashort Optical Pulse Amplifier issued to Clark, U.S. Pat. No. 5,861,973 for An Optical Amplifier for Correctively Amplifying Optical Signals Having a Plurality of Multiplexed Wavelengths issued to Inagaki et al., U.S. Pat. No. 5,963,363 for A System and Method for Amplifying an Optical Pulse and Pumping Laser Therefor issued to Weston et al., U.S. Pat. No. 5,568,309 for A System and Method for Amplification and Wavefront Compensation of Depolarized Optical Beams issued to Rockwell, U.S. Pat. No. 5,689,595 for A Rare Earth-doped Fiber Amplifier Assemblies for Fiberoptic Networks issued to Pan, and U.S. Pat. No. 5,136,420 for An Optical Fiber Amplifier issued to Inagaki et al.

While these recent efforts provide advantages, I note that they fail to adequately provide an improved broadband light source using seed-beam.

SUMMARY OF THE INVENTION

Accordingly, the present invention has been made in an effort to solve the problems occurring in the related art, and an object of the present invention is to provide a broadband light source which can reduce the strength difference between the output lights per wavelength by heightening the strength of the output light corresponding to the L-band of the light source for measurement, and thus reduce the measurement error per wavelength.

In order to achieve the above object and others, according to the present invention, there is provided a broadband light source for measurement using a seed-beam and having a rare earth ion-doped optical fiber, comprising a seed-beam light source for outputting a seed-beam of a predetermined band of wavelength, a first optical coupler for combining the seed-beam and a pumping light and making a combined light incident to a front of the rare earth ion-doped optical fiber, a first pumping light source for providing the pumping light to the first optical coupler, a second optical coupler for making the input pumping light incident to a rear of the rare earth ion-doped optical fiber, a second pumping light source for providing the pumping light to the second optical coupler, and an output terminal for radiating the light outputted through the rear of the rare earth ion-doped optical fiber.

In another aspect of the present invention, there is provided a broadband light source for measurement using a seed-beam and having a rare earth ion-doped optical fiber, comprising a first optical coupler for making an input first pumping light incident to a front of the rare earth ion-doped optical fiber, a first pumping light source for providing the first pumping light to the first optical coupler, a second optical coupler for making an input second pumping light incident to a rear of the rare earth ion-doped optical fiber, a second pumping light source for providing the second pumping light to the second optical coupler, a seed-beam light source for outputting the seed-beam of a predetermined band of wavelength, a seed-beam coupler for making the seed-beam incident to the rear of the rare earth ion-doped optical fiber, and an output terminal for radiating the light outputted through the rear of the rare earth ion-doped optical fiber.

To achieve these and other objects in accordance with the principles of the present invention, as embodied and broadly described, the present invention provides an apparatus, comprising: a seed-beam light source outputting a seed-beam of a predetermined band of wavelength; a first optical coupler combining said seed-beam with a first pumping light to form first combined light; a rare earth ion-doped optical fiber having a front side and a rear side, said first optical coupler guiding said first combined light to be incident to said front side of said rare earth ion-doped optical fiber; a first pumping light source supplying said first pumping light to said first optical coupler; a second optical coupler guiding second pumping light to be incident to said rear side of said rare earth ion-doped optical fiber; a second pumping light source supplying said second pumping light to said second optical coupler; and an output terminal radiating light outputted through said rear side of said rare earth ion-doped optical fiber.

To achieve these and other objects in accordance with the principles of the present invention, as embodied and broadly described, the present invention provides a broadband light source apparatus for measurement using a seed-beam, comprising: a rare earth ion-doped optical fiber having a front and a rear; a first optical coupler guiding a first pumping light to be incident to said front of said rare earth ion-doped optical fiber; a first pumping light source providing said first pumping light to said first optical coupler; a second optical coupler guiding a second pumping light to be incident to said rear of said rare earth ion-doped optical fiber; a second pumping light source providing said second pumping light to said second optical coupler; a seed-beam light source outputting the seed-beam of a predetermined band of wavelength; a seed-beam coupler guiding the seed-beam to be incident to said rear of said rare earth ion-doped optical fiber; and an output terminal radiating light outputted through said rear of said rare earth ion-doped optical fiber.

To achieve these and other objects in accordance with the principles of the present invention, as embodied and broadly described, the present invention provides a light-emitting apparatus using an optical fiber, said apparatus comprising: an optical fiber having a front side and a rear side; a first optical coupler guiding a first pumping light to be incident to said front side of said optical fiber; a first pumping light source providing said first pumping light to said first optical coupler; a seed-beam light source outputting a seed-beam to said optical fiber, said seed-beam having a predetermined band of wavelength; a first optical isolator being positioned adjacent to said seed-beam light source, said optical isolator preventing light outputted from said optical fiber from being incident to said seed-beam light source; and an output terminal radiating the light outputted through said rear side of said optical fiber.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

A wavelength division multiplexing system (WDM), which is proposed as an information transmitting system using an optical fiber, is a system for simultaneously transmitting light signals having different wavelengths, and is applied to an optical transmitting system having a very large capacity.

The WDM type optical communication system employs various kinds of optical devices such as a rare earth ion-doped optical fiber amplifier capable of simultaneously amplifying light signals of various channels without a photoelectric conversion. A manufacturer or system designer measures whether the optical devices including the rare earth ion-doped optical fiber amplifier are manufactured in coincidence with the design specification, or whether the characteristics of the optical devices satisfy the conditions of the optical communication system. The measurement of the characteristics of such optical devices is performed using a measuring device.

Figure 1:
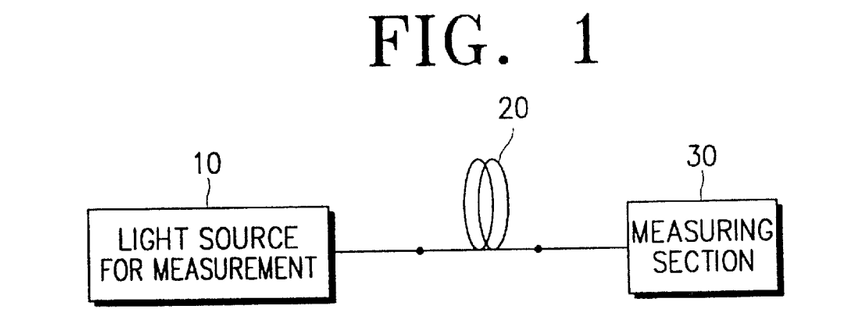
FIG. 1 is a view illustrating the construction of an apparatus for measuring the characteristics of a rare earth ion-doped optical fiber.

FIG. 1 shows a device for measuring the characteristics of the rare earth ion-doped optical fiber. As shown in FIG. 1, the device for measuring the characteristics of the rare earth ion-doped optical fiber includes a light source 10 for measurement and a measuring section 30, and an erbium (Er) ion-doped optical fiber which is a kind of the rare earth ion-doped optical fiber 20 to be measured is connected between the light source 10 and the measuring section 30.

As the light source 10 for measurement is used a light source that can output a light having a band of wavelength in the range of 1520 nanometers (nm)~1570 nanometers (nm) to which the Er ion-doped optical fiber to be measured is applied. The light source 10 for measurement outputs a light of a conventional band (C-band) in the range of 1520 nm~1570 nm and a light of a long band (L-band) in the range of 1570 nm~1620 nm. A white light source such as a halogen lamp manufactured for the measurement of optical devices may be used as the light source 10 for measurement, but the strength of the light outputted from the white light source is weak, causing the measurement of the characteristics of the optical devices to be limited. Thus, a broadband light source using an amplified spontaneous emission of the rare earth ion-doped optical fiber has been used.

The measuring section 30 measures the performance characteristics such as the absorption spectrum of the rare earth ion-doped optical fiber 20, optical signal-to-noise ratio (OSNR), and so on by comparing the strength of the light before being incident to the rare earth ion-doped optical fiber 20 with the strength of the light amplified as passing through the rare earth ion-doped optical fiber 20 for each wavelength. The measuring section 30 is provided with a measuring device such as an optical spectrum analyzer.

Figure 2:
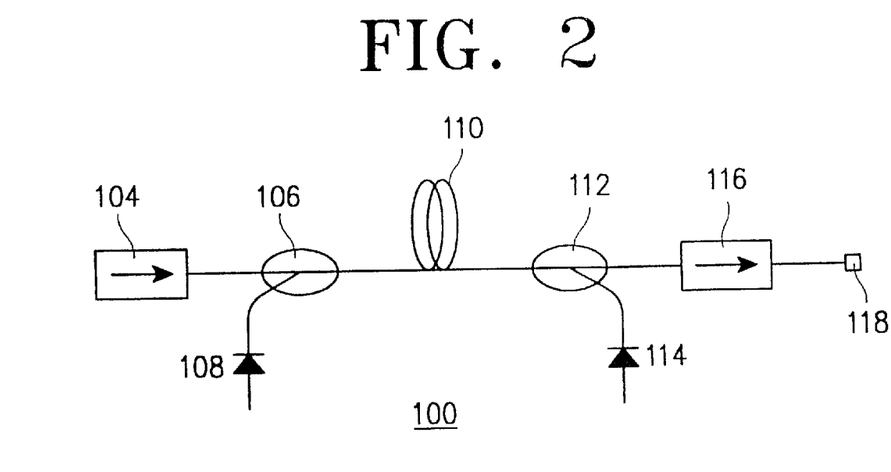
FIG. 2 is a view illustrating the construction of a broadband light source using a rare earth ion-doped optical fiber amplifier.

FIG. 2 shows the construction of a broadband light source using a rare earth ion-doped optical fiber amplifier. As shown in FIG. 2, the broadband light source 100 using the rare earth ion-doped optical fiber amplifier comprises a first optical isolator 104, a first optical coupler 106, a first pumping light source 108, a rare earth ion-doped optical fiber 110, a second optical coupler 112, a second pumping light source 114, and a second optical isolator 116.

The broadband light source 100 is a light source for measurement using an amplified spontaneous emission (ASE) light of a broad band of wavelength as an output light, and outputs the C-band light and the L-band light. Specifically, it outputs the C-band light of the band of wavelength in the range of 1520 nm~1570 nm and the L-band light of the band of wavelength in the range of 1570 nm~1620 nm.

A forward pumping light outputted from the first pumping light source 108 is incident to the front end of the rare earth ion-doped optical fiber 110 through the first optical coupler 106, and a backward pumping light outputted from the second pumping light source 114 is incident to the rear end of the rare earth ion-doped optical fiber 110 through the second optical coupler 112.

Light is generated inside the rare earth ion-doped optical fiber 110 by stimulated emission and spontaneous emission of rare earth ions excited by the forward and backward pumping light. The light generated by the spontaneous emission is amplified by the internal reflection thereof as it passes through the long rare earth ion-doped optical fiber, and the amplified light and the amplified spontaneous emission light are outputted outside the broadband light source 100 through an output terminal 118.

The first optical isolator 104 prevents the deterioration of the amplification efficiency of the rare earth ion-doped optical fiber by preventing the backward amplified spontaneous emission outputted from the front end of the rare earth ion-doped optical fiber 110 from being incident again to the rare earth ion-doped optical fiber 110, and the second optical isolator 116 prevents the deterioration of the amplification efficiency of the rare earth ion-doped optical fiber 110 by preventing the amplified spontaneous emission outputted from the rear end of the rare earth ion-doped optical fiber 110 and then reflected from the output terminal from being incident again to the rare earth ion-doped optical fiber 110.

The broadband light source 100 uses as its amplification medium the rare earth ion-doped optical fiber that is 5 to 20 times longer than the general C-band rare earth ion-doped optical fiber. The amplified spontaneous emission of the C-band serves to amplify the L-band light as it passes through the long rare earth ion-doped optical fiber 110. The broadband light source using the long rare earth ion-doped optical fiber as described above has a reduced gain of the C-band, but has a increased gain of the L-band, thereby improving the output of the L-band light. Thus, the broadband light source can be used as the light source for measuring the characteristics of the broadband optical device such as the rare earth ion-doped optical fiber. As rare earth elements doped on the rare earth ion-doped optical fiber exist erbium (Er), ytterbium (Yb), neodymium (Nd), etc.

Meanwhile, the output strength of the broadband light source using the rare earth ion-doped optical fiber as described above is proportional to the peak power of the pumping light rather than the total power of the pumping light. Accordingly, if the peak power of the pumping light according to the wavelength is low even though the total power thereof is high, the output strength of the broadband light source becomes degraded.

According to the broadband light source 100, the spontaneously emitted light of the C-band is amplified as it passes through the rare earth ion-doped optical fiber, and the amplified spontaneous emission of the C-band generated accordingly amplifies the L-band light. The amplified spontaneous emission of the C-band, which amplifies the L-band light, has a broad band of wavelength, so that the broadband light source 100 has the characteristics that the strength of the total power is high, but the strength of the peak power per wavelength is low.

Specifically, the rare earth ions in the rare earth ion-doped optical fiber 110, which is the amplification medium, are more excited as the peak power of the amplified spontaneous emission per wavelength, which acts as the pumping light for the L-band, becomes higher, and thus the L-band output can be effectively amplified. According to the broadband light source 100, the amplified spontaneous emission which has a high total power but has a low peak power amplifies the L-band light, and thus the output strength of the L-band output light becomes lower than that of the C-band output light. Such a difference of strength between the output lights per wavelength causes the generation of the measurement error due to the wavelength when the measurement of the characteristics of the optical device is performed using the broadband light source.

For example, in case of measuring the absorption spectrum of the rare earth ion-doped optical fiber using the broadband light source, the light outputted from the broadband light source is incident to the front end of the rare earth ion-doped optical fiber. At this time, since the output of the L-band light is greatly lower than the output of the C-band light, the measurement error is produced due to the difference of strength between the output lights in the measuring section. In other words, since the C-band wavelength having a high strength of the output light absorbs energy and excites the L-band wavelength having a relatively low strength of the output light, the absorption spectrum with respect to the measured L-band wavelength cannot be considered as the characteristics of the pure L-band wavelength.

Also, in the event that the strength of the output light of the L-band outputted from the broadband light source is too low, the output light of the L-band deviates from the measuring sensitivity of the measuring device such as the optical spectrum analyzer even though the output light passes through the optical device such as the Er ion-doped optical fiber to be measured, and thus the measurement itself becomes impossible.

In the following description of the present invention, a detailed description of known functions and configurations incorporated herein will be omitted when it may make the subject matter of the present invention rather unclear.

Figure 3:
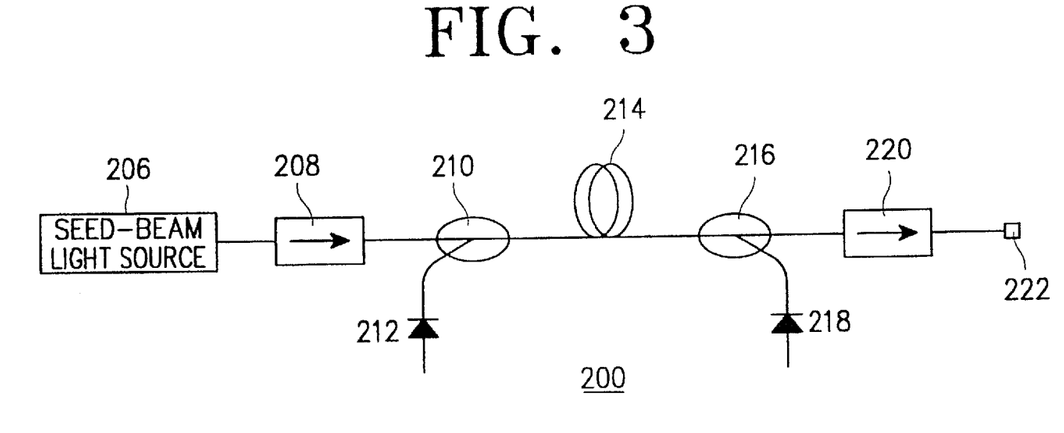
FIG. 3 is a view illustrating the construction of a broadband light source using a seed-beam according to a first embodiment, in accordance with the principles of the present invention.
Figure 4:
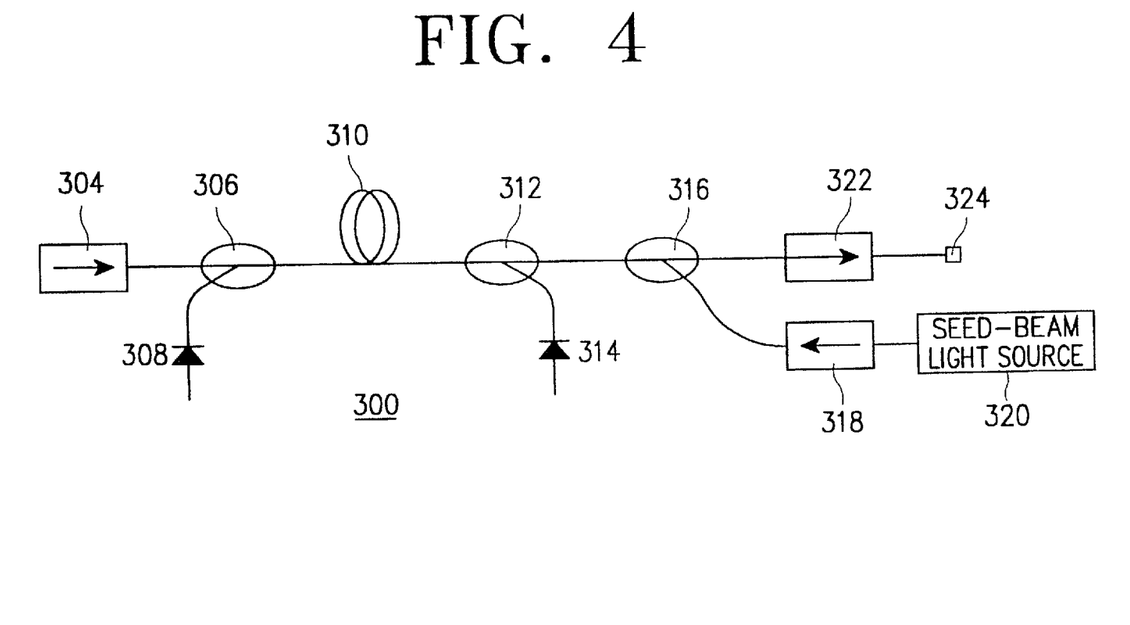
FIG. 4 is a view illustrating the construction of the broadband light source using a seed-beam according to a second embodiment, in accordance with the principles of the present invention.

The present invention provides a broadband light source which can reduce the strength difference between the output lights per wavelength by heightening the strength of the output light corresponding to the L-band of the light source for measurement, and thus reduce the measurement error per wavelength. According to the present invention, the strength of the L-band output light of the broadband light source is increased using the seed-beam outputted from the seed-beam light source, and accordingly the strength difference between the output lights due to the wavelengths of the output lights is reduced. FIGS. 3 and 4 illustrate the embodiments of the present invention.

FIG. 3 is a view illustrating the construction of the broadband light source using a seed-beam according to an embodiment of the present invention. In FIG. 3, the seed-beam outputted from the seed-beam light source is inputted in a forward direction with respect to the rare earth ion-doped optical fiber.

Referring to FIG. 3, the broadband light source 200 according to an embodiment of the present invention comprises a seed-beam light source 206, a first optical isolator 208, a first optical coupler 210, a first pumping light source 212, a rare earth ion-doped optical fiber 214, a second optical coupler 216, a second pumping light source 218, and a second optical isolator 220.

The seed-beam light source 206 outputs a seed-beam of a predetermined band of wavelength. For the seed-beam light source 206, a light-emitting diode (LED) or laser diode (LD) is used, which outputs the seed-beam of the wavelength in the range of 1520 nm~1570 nm that is the band of wavelength within the C-band. The seed-beam is inputted into the rare earth ion-doped optical fiber 210, and increases the excitation of the rare earth ions, so that the peak power of the amplified spontaneous emission in the C-band per wavelength is enlarged. Specifically, since the amplified spontaneous emission amplifies the L-band light in a state that the peak power per wavelength is heightened, the amplification efficiency and output strength of the L-band light become heightened.

The first optical isolator 208 prevents the distortion of the seed-beam outputted from the seed-beam light source 206 by intercepting the backward amplified spontaneous emission outputted from the front end of the rare earth ion-doped optical fiber 214 to the seed-beam light source 206.

The first pumping light source 212 outputs the pumping light of a predetermined wavelength. As the first pumping light source 212 is used a pump laser diode which outputs the pumping light having the wavelength of 980 nm or 1480 nm.

The first optical coupler 210 combines the seed-beam outputted from the seed-beam light source 206 with the pumping light inputted from the first pumping light source 212, and outputs the combined light to the front of the rare earth ion-doped optical fiber 214.

The rare earth ion-doped optical fiber 214 is a medium which amplifies and outputs the light within the broadband light source 200. The rare earth ion-doped optical fiber 214 includes the erbium ion-doped optical fiber such as a silica-based erbium doped fiber (S-EDF), fluoride-based EDF (F-EDF), telluride-based EDF (T-EDF), and is formed 5 to 20 times longer than the general C-band rare earth ion-doped optical fiber. If the forward and backward pumping lights are provided in the rare earth ion-doped optical fiber 214, the spontaneously emitted light is generated according to the excitation of the rare earth ions. The spontaneously emitted light is amplified as passing through the long rare earth ion-doped optical fiber to be the amplified spontaneous emission light. Meanwhile, the L-band light among the generated lights is amplified by the action of the C-band and the seed-beam. Specifically, the seed-beam heightens the strength of the peak power of the amplified spontaneous emission by increasing the excitation of the rare earth ions, resulting in that the amplification efficiency of the amplified spontaneous emission with respect to the L-band light is heightened, and thus the output strength of the L-band light is heightened.

In other words, as described above, the amplification efficiency and the output strength of the L-band light are heightened as the peak power thereof according to the wavelength of the C-band amplified spontaneous emission that serves as a pump becomes higher. Thus, the seed-beam of the C-band according to the present invention heightens the peak power of the C-band amplified spontaneous emission that amplifies the L-band light, and this results in that the amplification efficiency and the output strength of the L-band light are heightened. The C-band and the L-band lights amplified within the rare earth ion-doped optical fiber 214 as described above are outputted outside through the output terminal 222.

The second pumping light source 218 outputs the pumping light of a predetermined wavelength. As the second pumping light source is used a pump laser diode which outputs the pumping light having the wavelength of 980 nm or 1480 nm.

The second optical coupler 216 outputs the pumping light inputted from the second pumping light source 218 to the rear of the rare earth ion-doped optical fiber 214.

The second optical isolator 220 prevents the deterioration of the amplification efficiency of the rare earth ion-doped optical fiber 214 by preventing the amplified spontaneous emission, which is outputted from the rear of the rare earth ion-doped optical fiber 214 and then reflected from the output terminal 222, from being incident again to the rear of the rare earth ion-doped optical fiber 214.

Meanwhile, though FIG. 3 illustrates the embodiment of the present invention which is applied to the bidirectional pumping type broadband light source using two pumping light sources, it will be understood to those skilled in the art that the present invention can also be applied to a forward or backward pumping type broadband light source using a single pumping light source.

FIG. 4 is a view illustrating the construction of the broadband light source using a seed-beam according to another embodiment of the present invention.

Referring to FIG. 4, the broadband light source 300 according to another embodiment of the present invention comprises a first optical isolator 304, a first optical coupler 306, a first pumping light source 308, a rare earth ion-doped optical fiber 310, a second optical coupler 312, a second pumping light source 314, a seed-beam coupler 316, a seed-beam light source 320, and a third optical isolator 322.

The first optical isolator 304 intercepts the backward amplified spontaneous emission outputted from the front end of the rare earth ion-doped optical fiber 310.

The first pumping light source 308 out puts the pumping light of a predetermined wavelength. As the first pumping light source 308 is used a pump laser diode which outputs the pumping light having the wavelength of 980 nm or 1480 nm.

The first optical coupler 306 outputs the pumping light inputted from the first pumping light source 308 to the front of the rare earth ion-doped optical fiber 310.

The rare earth ion-doped optical fiber 310 is a medium which amplifies the light within the broadband light source 200. The rare earth ion-doped optical fiber 310 includes the Er ion-doped optical fiber such as a silica-based erbium doped fiber (S-EDF), fluoride-based EDF (F-EDF), telluride-based EDF (T-EDF), and is formed 10 to 20 times longer than the general C-band rare earth ion-doped optical fiber. If the forward and backward pumping lights are provided in the rare earth ion-doped optical fiber 310, the spontaneously emitted light is generated according to the excitation of the rare earth ions. The spontaneously emitted light is amplified as passing through the long rare earth ion-doped optical fiber to be the amplified spontaneous emission light.

Meanwhile, the L-band light among the generated lights is amplified by the action of the C-band amplified spontaneous emission and the seed-beam. Specifically, the seed-beam heightens the strength of the peak power of the amplified spontaneous emission by increasing the excitation of the rare earth ions, and thus heightens the output strength of the L-band light.

In other words, the amplification efficiency and the output strength of the L-band light are heightened as the strength of the peak power according to the wavelength of the C-band amplified spontaneous emission that serves as a pump becomes higher. Thus, the seed-beam of the C-band according to the characteristics of the present invention heightens the strength of the peak power of the C-band amplified spontaneous emission that amplifies the L-band light, and this results in that the amplification efficiency and the output strength of the L-band light are heightened. The C-band and the L-band lights amplified within the rare earth ion-doped optical fiber 310 as described above are outputted to an object to be measured through the output terminal 324.

The second pumping light source 314 outputs the pumping light of a predetermined wavelength. As the second pumping light source 314 is used a pump laser diode which outputs the pumping light having the wavelength of 980 nm or 1480 nm.

The second optical coupler 312 outputs the pumping light inputted from the second pumping light source 314 to the rear of the rare earth ion-doped optical fiber 310.

The seed-beam coupler 316 outputs the seed-beam outputted from the seed-beam light source 320 to the rear of the rare earth ion-doped optical fiber 310.

The seed-beam light source 320 outputs the seed-beam of a predetermined band of wavelength. As the seed-beam light source 320 is used a light-emitting diode (LED) or laser diode (LD) which outputs the seed-beam of the wavelength in the range of 1520 nm~1570 nm that is the band of wavelength within the C-band. The seed-beam is inputted into the rare earth ion-doped optical fiber 310, and increases the excitation of the rare earth ions, so that the peak power of the C-band amplified spontaneous emission per wavelength is enlarged. Specifically, since the amplified spontaneous emission amplifies the L-band light in a state that the peak power thereof per wavelength is heightened, the output strength of the L-band light become heightened.

The second optical isolator 318 prevents the distortion of the seed-beam by preventing the amplified spontaneous emission, which is outputted from the rear of the rare earth ion-doped optical fiber 310, from being incident again to the seed-beam light source 320.

The third optical isolator 322 prevents the deterioration of the amplification efficiency of the rare earth ion-doped optical fiber 310 by preventing the amplified spontaneous emission, which is reflected from the output terminal 324, from being incident again to the rare earth ion-doped optical fiber 310.

Meanwhile, though FIG. 4 illustrates the embodiment of the present invention which is applied to the bidirectional pumping type broadband light source using two pumping light sources, it will be understood to those skilled in the art that the present invention can also be applied to a forward or backward pumping type broadband light source using a single pumping light source as described in the embodiment of FIG. 3.

Figure 5:
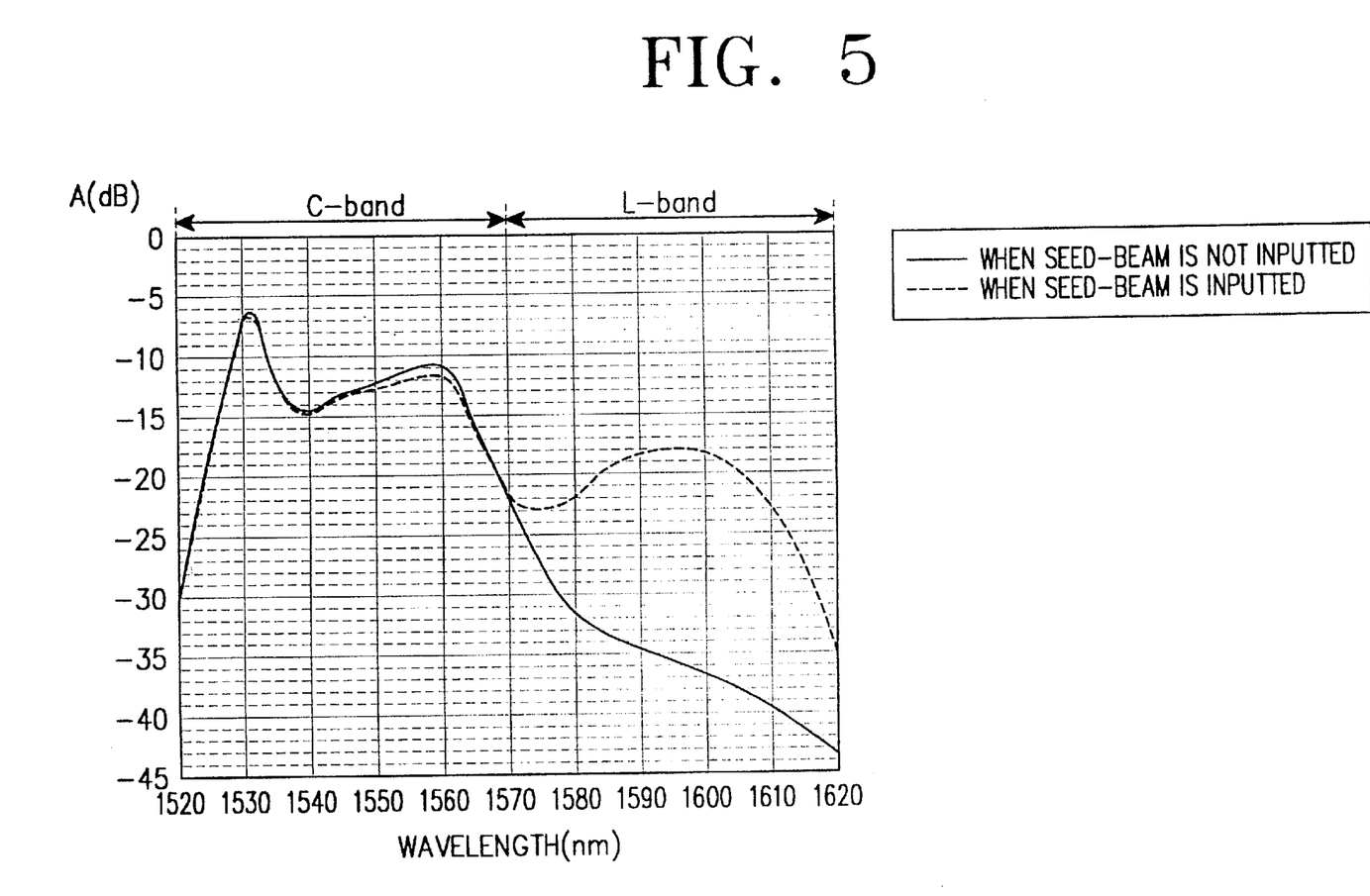
FIG. 5 is a graph showing the output characteristics of the broadband light source using a seed-beam, in accordance with the principles of the present invention.

FIG. 5 is a graph showing the output characteristics of the broadband light source using the seed-beam according to the embodiments of the present invention. In FIG. 5, the horizontal axis indicates the wavelength of the light outputted from the broadband light source, and the vertical axis indicates the strength of the output light. The curve shown by a dotted line represents the output characteristics per wavelength of the conventional broadband light source that does not use the seed-beam, and the curve shown by a solid line represents the output characteristics per wavelength of the broadband light source using the seed-beam according to the embodiments of the present invention.

As shown in FIG. 5, the broadband light source according to the present invention is similar to the conventional broadband light source in variation of the strength of the output light corresponding to the C-band (1520 nm~1570 nm). However, the broadband light source according to the present invention is quite different from the conventional broadband light source in variation of the strength of the output light corresponding to the L-band (1570 nm~1620 nm).

Specifically, it can be recognized that as the wavelength of the output light of the conventional broadband light source becomes longer than 1570 nm, the strength of the output light thereof is suddenly reduced. On the contrary, it can be recognized that according to the present invention, even if the wavelength of the output light of the broadband light source is longer than 1570 nm, the strength of the output light thereof is rather increased from −22 dBm to −18 dBm until the wave length reaches 1,600 nm.

Also, it can be observed that according to the broadband light source of the present invention, the strength difference between the output lights of the C-band and L-band is reduced as the strength of the output light of the L-band is increased.

As described above, the broadband light source using a seed-beam according to the present invention can reduce the strength difference per wavelength between the output lights of the broadband light source by heightening the strength of the L-band output light relatively lower than the C-band output light, and thus reduce the measurement error generated during the characteristic measurement of the optical device by the broadband light source, resulting in that the reliability of the result of measurement is improved.

While this invention has been described in connection with what is presently considered to be the most practical and preferred embodiments, it is to be understood that other modifications thereof may be made without departing from the scope of the invention. Thus, the invention should not be limited to the disclosed embodiment, but should be defined by the scope of the appended claims and their equivalents.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
    a seed-beam light source outputting a seed-beam of a predetermined band of wavelength;
    a first optical coupler guiding a first pumping light;
    a rare earth ion-doped optical fiber having a front side and a rear side, said first optical coupler guiding said first pumping light to be incident to said front side of said rare earth ion-doped optical fiber;
    a first pumping light source supplying said first pumping light to said first optical coupler;
    a second optical coupler guiding second pumping light to be incident to said rear side of said rare earth ion-doped optical fiber;
    a second pumping light source supplying said second pumping light to said second optical coupler;
    a third optical coupler being positioned between said seed-beam light source and said second optical coupler, said third optical coupler receiving said seed-beam outputted from said seed-beam light source and guiding said seed-beam to be incident to said rear side of said optical fiber; and an output terminal radiating light outputted through said rear side of said rare earth ion-doped optical fiber.

2. The apparatus of claim 1, said apparatus corresponding to a broadband light source for measurement using said seed-beam.

3. The apparatus of claim 2, further comprising an optical isolator being positioned between said seed-beam light source and said third optical coupler, said optical isolator preventing light outputted from said optical fiber from being incident to said seed-beam light source.

4. The apparatus of claim 2, further comprising an optical isolator being positioned between said second optical coupler and said output terminal.

5. The apparatus of claim 2, said predetermined band of wavelength of said seed-beam corresponding to a wavelength range of 1520 nanometers to 1570 nanometers.

6. The apparatus of claim 2, further comprising:
a first optical isolator being positioned between said seed-beam light source and said third optical coupler; and
a second optical isolator being positioned between said third optical coupler and said output terminal.

7. The apparatus of claim 2, said rare earth ion-doped optical fiber being an erbium ion-doped optical fiber.

8. The apparatus of claim 2, said rare earth ion-doped optical fiber corresponding to an erbium ion-doped optical fiber selected from the group consisting of silica-based erbium doped fiber, fluoride-based erbium doped fiber, and telluride-based erbium doped fiber.

9. The apparatus of claim 1, further comprising an optical isolator being positioned between said seed-beam light source and said third optical coupler.

10. The apparatus of claim 1, further comprising first optical isolator being positioned adjacent to said first optical coupler, said first optical isolator intercepting backward amplified spontaneous emission emitted from said front side of said optical fiber.

11. The apparatus of claim 10, said predetermined band of wavelength of said seed-beam corresponding to a wavelength range of a conventional band-(C-band).

12. The apparatus of claim 11, further comprising:
a second optical isolator being positioned between said seed-beam light source and said third optical coupler, said second optical isolator preventing light emitted from said optical fiber from being incident to said seed-beam light source; and
a third optical isolator being positioned between said third optical coupler and said output terminal, said third optical isolator preventing amplified spontaneous emission reflected back at said output terminal from being incident to said rear side of said optical fiber.

13. The apparatus of claim 12, said seed-beam increasing a strength of long band (L-band) light radiated from said output terminal.

14. The apparatus of claim 13, wherein said rare earth ion-doped optical fiber corresponds to an erbium ion-doped optical fiber is selected from the group consisting of silica-based erbium doped fiber, fluoride-based erbium doped fiber, and telluride-based erbium doped fiber.

15. A broadband light source apparatus for measurement using a seed-beam, comprising:
a rare earth ion-doped optical fiber having a front and a rear;
a first optical coupler guiding a first pumping light to be incident to said front of said rare earth ion-doped optical fiber;
a first pumping light source providing said first pumping light to said first optical coupler;
a second optical coupler guiding a second pumping light to be incident to said rear of said rare earth ion-doped optical fiber;
a second pumping light source providing said second pumping light to said second optical coupler;
a seed-beam light source outputting the seed-beam of a predetermined band of wavelength;
a seed-beam coupler guiding the seed-beam to be incident to said rear of said rare earth ion-doped optical fiber; and
an output terminal radiating light outputted through said rear of said rare earth ion-doped optical fiber.

16. The apparatus of claim 15, further comprising:
an optical isolator being positioned between said seed-beam light source and said seed-beam coupler, said optical isolator preventing the light outputted from said rear of said rare earth ion-doped optical fiber from being incident to said seed-beam light source.

17. The apparatus of claim 15 said predetermined band of wavelength of said seed-beam outputted from said seed-beam light source including a wavelength in a range of 1520 nanometers through 1570 nanometers.

18. The apparatus of claim 15, further comprising an optical isolator being positioned between said second optical coupler and said output terminal.

19. The apparatus of claim 15, said predetermined band of wavelength of said seed-beam being in a range of a conventional band (C-band), said seed-beam increasing a strength of long band (L-band) light radiated from said output terminal.

20. A light-emitting apparatus using an optical fiber, said apparatus comprising:
an optical fiber having a front side and a rear side;
a first pumping light source providing a first pumping light to said front side of said optical fiber;
a second pumping light source providing a second pumping light to said rear side of said optical fiber;
a seed-beam light source outputting a seed-beam to said rear side of said optical fiber, said seed-beam having a predetermined band of wavelength;
a first optical isolator being positioned adjacent to said seed-beam light source, said optical isolator preventing light outputted from said optical fiber from being incident to said seed-beam light source; and
an output terminal radiating the light outputted through said rear side of said optical fiber.

21. The apparatus of claim 20, said predetermined band of wavelength of said seed-beam being in a range of a conventional band (C-band), said seed-beam increasing a strength of long band (L-band) light radiated from said output terminal.

22. The apparatus of claim 21, further comprising:
a first coupler guiding said first pumping light from said first pumping light source to said front side of said optical fiber;
a second coupler guiding said second pumping light from said second pumping light source to said rear side of said optical fiber; and
a third coupler guiding said seed beam from said seed-beam light source to said rear side of said optical fiber.

23. The apparatus of claim 22, further comprising:
a second optical isolator being positioned adjacent to said first optical coupler, said first optical isolator intercepting backward amplified spontaneous emission emitted from said front side of said optical fiber.

24. The apparatus of claim 23, further comprising:
a third optical isolator being positioned between said third optical coupler and said output terminal, said third optical isolator preventing amplified spontaneous emission reflected back at said output terminal from being incident to said rear side of said optical fiber.

25. The apparatus of claim 24, said second optical coupler being positioned between said optical fiber and said third optical coupler.

26. The apparatus of claim 25, wherein said erbium ion-doped optical fiber is selected from the group consisting of silica-based erbium doped fiber, fluoride-based erbium doped fiber, and telluride-based erbium doped fiber.

27. The apparatus of claim 26, said third optical coupler being positioned between said output terminal and said second optical coupler.

28. The apparatus of claim 27, said conventional band (C-band) corresponding to a wavelength range from 1520 nanometers through 1570 nanometers, said long band (L-band) corresponding to a wavelength range from 1570 nanometers through 1620 nanometers.

29. The apparatus of claim 24, said conventional band (C-band) corresponding to a wavelength range from 1520 nanometers through 1570 nanometers, said long band (L-band) corresponding to a wavelength range from 1570 nanometers through 1620 nanometers.

* * * * *